United States Patent
Leak

(10) Patent No.: US 12,453,587 B1
(45) Date of Patent: Oct. 28, 2025

(54) BONE FIXATION FASTENER AND ASSEMBLY

(71) Applicant: Leith Medical, Inc., Austin, TX (US)

(72) Inventor: Timothy Leak, Austin, TX (US)

(73) Assignee: LEITH MEDICAL, INC., Austin, TX (US)

( * ) Notice: Subject to any disclaimer, the term of this patent is extended or adjusted under 35 U.S.C. 154(b) by 12 days.

(21) Appl. No.: 18/647,113

(22) Filed: Apr. 26, 2024

(51) Int. Cl.
*A61B 17/80* (2006.01)

(52) U.S. Cl.
CPC ................................. *A61B 17/8052* (2013.01)

(58) Field of Classification Search
CPC . A61B 17/80; A61B 17/8033; A61B 17/8042; A61B 17/8047; A61B 17/8052; A61B 17/8057
See application file for complete search history.

(56) References Cited

U.S. PATENT DOCUMENTS

2009/0012571 A1   1/2009   Perrow et al. ................ 606/280

FOREIGN PATENT DOCUMENTS

| WO | 2011/011726 A2 | 1/2011 | |
|---|---|---|---|
| WO | 2014/062690 A1 | 4/2014 | |
| WO | WO-2021076461 A1 * | 4/2021 | ......... A61B 17/8888 |

OTHER PUBLICATIONS

International Search Report and Written Opinion, Application No. PCT/US2024/026436, 12 pages, Nov. 19, 2024.

* cited by examiner

*Primary Examiner* — Si Ming Ku
(74) *Attorney, Agent, or Firm* — Slayden Grubert Beard PLLC

(57) ABSTRACT

A bone fixation assembly is disclosed. The bone fixation assembly includes a bone fixation plate with a fastener hole adjacent to a cavity. The bone fixation assembly also includes a clip including a body positioned at least partially in the cavity and a plurality of tabs extending inward from the body. The bone fixation assembly also includes a fastener with a fastener body having screw threads and a head extending from the fastener body to a first end of the fastener. The head includes a recess extending into the head from a first surface at the first end of the fastener, and further includes a backout groove that spirals around a tapered portion of the head in a direction from the first end of the fastener toward the fastener body of the fastener.

20 Claims, 12 Drawing Sheets

BONE FIXATION FASTENER AND ASSEMBLY

TECHNICAL FIELD

The disclosure relates generally to orthopedic devices, and more specifically, to a bone fixation system with an anti-backout feature and a removal tool.

BACKGROUND

For various bone fractures, the use of orthopedic plates is a technique to stabilize the bone as needed for proper healing. Generally, a rigid, often metal plate is placed on the outer surface of the bone across the fracture, and orthopedic screws extend through the plate into the bone on either side of the fracture. The plate offers support and stability to the bone during the healing period.

The term "micromotion" refers to microscopic relative displacements of a loaded intraosseously implanted orthopedic hardware component with respect to the bone surrounding it. Micromotion between the bone and the portion of the orthopedic screws within the bone or vertebrae can cause loosening of one or more orthopedic screws, often called backout. When screw backout occurs, loosening of the entire assembly occurs, thereby diminishing the stability of the set fracture.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Details of one or more embodiments are set forth in the description below and the accompanying drawings. Other features will be apparent from the description, drawings, and from the claims.

Figure 1:
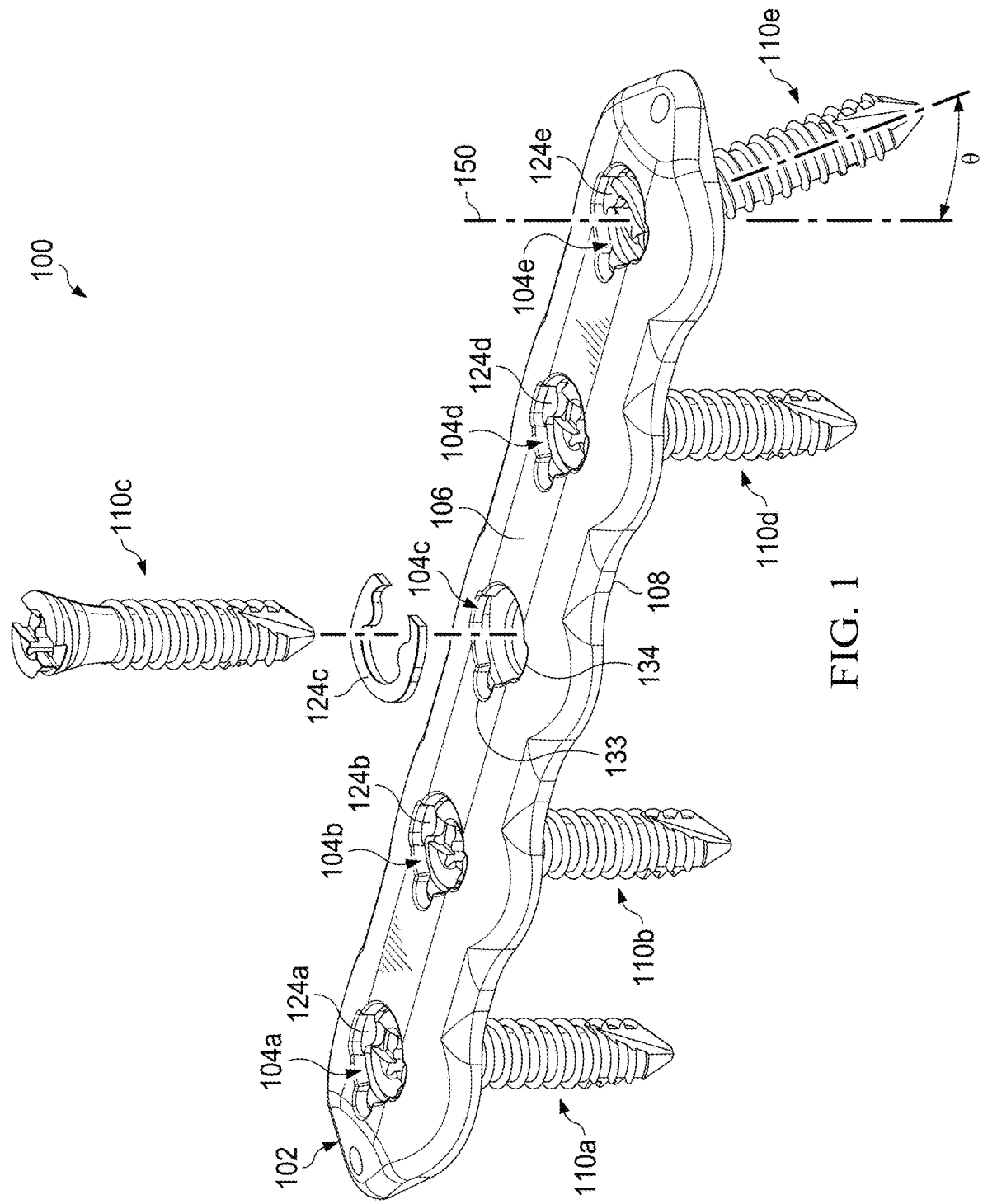
FIG. 1 illustrates a perspective view of a bone fixation system for stabilization of a bone fracture site in accordance with example embodiments of the present disclosure.

FIG. 1 illustrates a perspective view of a bone fixation assembly 100 for stabilization of a bone fracture site in accordance with example embodiments of the present disclosure. Bone fixation assembly 100 may include a bone fixation plate 102, fasteners 110a-110e, and clips 124a-124e.

Bone fixation plate 102 may include a plurality of fastener holes 104a, 104b, 104c, 104d, 104e (also referred to herein collectively as fastener holes 104 or individually as fastener hole 104). Fastener holes 104 may be positioned through bone fixation plate 102 from a top surface 106 to a bottom surface 108 of bone fixation plate 102. As shown in FIG. 1, bone fixation plate 102 may in some embodiments include five fastener holes 104. However, in other embodiments, bone fixation plate 102 may include any number of fastener holes 104 suitable given the length of the bone fixation plate 102. For example, applications that require a shorter bone fixation plate to stabilize a bone may include only two fastener holes 104. Further, applications that require a longer bone fixation plate to stabilize a bone may include six, seven, eight, nine, ten, or more fastener holes 104. Bone fixation plate 102 may be coupled to a bone (or other body surface such as a tendon, or a ligament) with fasteners 110a, 110b, 110c, 110d, 110e (also referred to herein collectively as fasteners 110 or individually as fastener 110). Fasteners 110 may be positioned through respective fastener holes 104. For example, a threaded portion of a fastener 110 may be positioned through a respective fastener hole 104 with a head of fastener 110 ultimately being positioned within the bone fixation plate 102 and either a top surface or a recess surface in the head of fastener 110 placed underneath a respective clip 124 (for example, from a top down view of the bone fixation assembly 100) to maintain a desired positioned of the fastener 110. As illustrated in FIG. 1, fasteners 110a, 110b, 110c, 110d, 110e may in some embodiments be positioned through fastener holes 104a, 104b, 104c, 104d, 104e respectively. In other embodiments, a subset of the fasteners 110 may be positioned through a subset of the respective fastener holes 104.

As described in further detail below with reference to FIG. 2, bone fixation plate 102 may include a cavity adjacent to each respective fastener hole to hold a respective clip 124. In some embodiments, one or more clips 124 may be assembled with bone fixation plate 102 prior to surgery, with clips 124 in a neutral or unflexed position. During assembly of clips 124 with bone fixation plate 102, clips 124 may be flexed inward to facilitate insertion into the fastener holes 104. When tension is released, clip 124 may transition back to a neutral, unflexed state and be positioned at least in part in the cavity adjacent to the respective fastener hole 104. As shown in FIG. 1, each fastener hole 104 may include a midline notch 133 and a side notch 134. In some embodiments, each fastener hole 104 may include two side notches 134, with the two side notches located on opposing sides of fastener hole 104. Midline notch 133 and side notches 134 may provide additional spacing along the top surface 106 for clip 124 to be inserted through a top portion of fastener hole 104 and into the respective cavity adjacent to fastener hole 104.

During surgery, fasteners 110 may be inserted downward such that threads of fasteners 110 engage an underlying body structure. Bone fixation plate 102 may therefore stabilize a fracture in the underlying body structure. As fastener 110 enters fastener hole 104, a head of the fastener 110 may apply a wedging force to a respective clip 124 to push outward on the tabs 140 of clip 124. Clip 124 may flex outward in a cavity and toward the sides of bone fixation plate 102 to allow the head of fastener 110 to pass either fully or partially through clip 124. For example, fastener 110 may be inserted until a recess in the head of fastener 110 aligns both rotationally and vertically with the tabs of the clip. At that point, clip 124 may return to a neutral, unflexed state, with the tabs of clip 124 resting within the recess and above a recessed surface in the head of fastener 110. Alternatively, fastener 110 may be inserted until a top surface of the head of fastener 110 passes under the tabs of clip 124, at which point clip 124 may return to a neutral, unflexed state over a top surface of the head of fastener 110. In both examples, clip 124 may maintain the positioning of the fastener 110 in the body structure and minimize and/or prevent backout of fastener 110.

In some examples, the number and/or collective size of openings in the top surface 106 of bone fixation plate 102 may be minimized to optimize the structural strength of bone fixation plate 102. For example, the fastener holes 104 and the respective midline notches 133 and side notches 134 may be of a minimal size to allow assembly of the clips 124 with bone fixation plate 102 and to allow ingression of the fasteners 110 therethrough.

Figure 2:
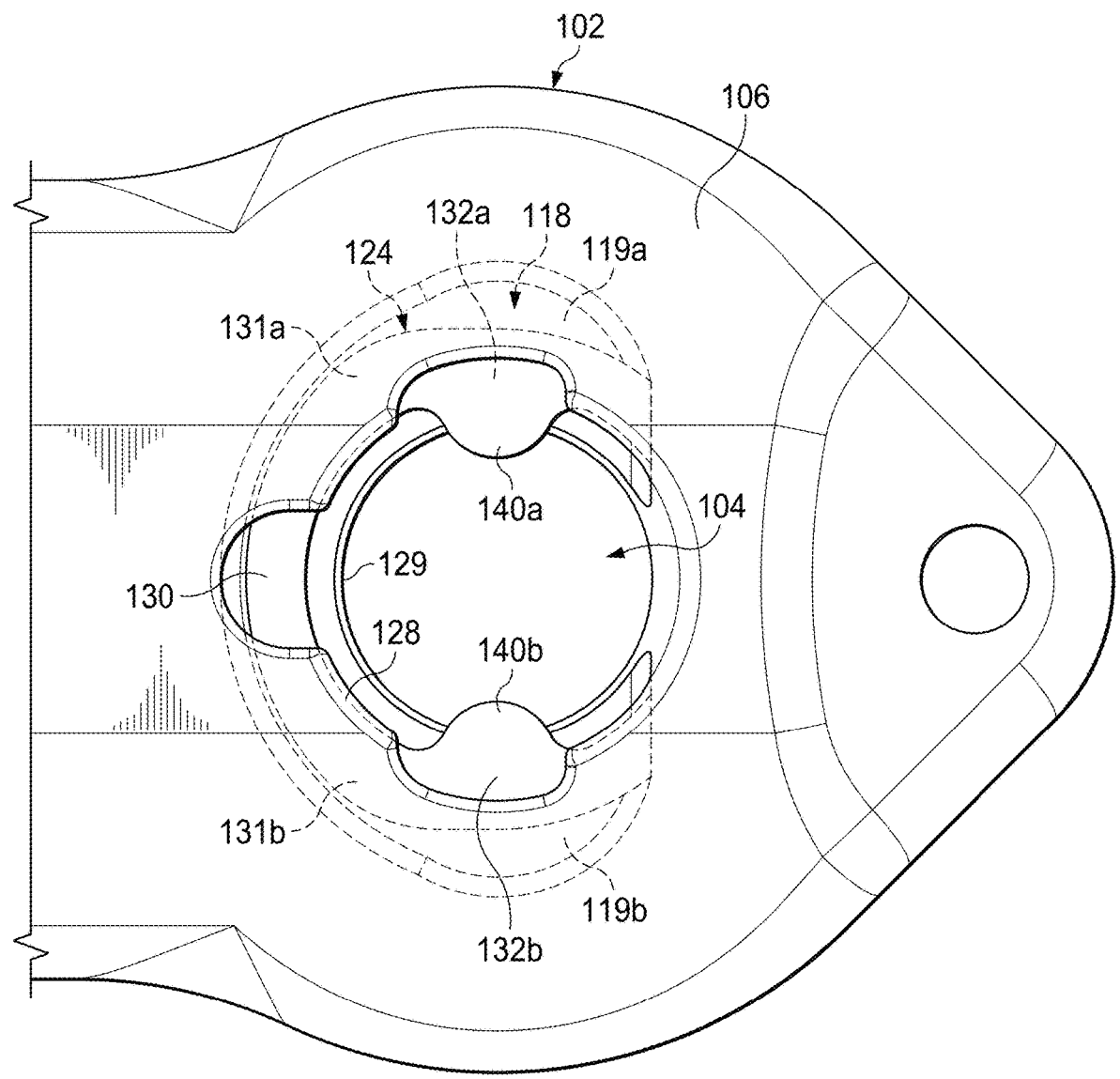
FIG. 2 illustrates a top view of a clip inserted in a cavity of a bone fixation plate in accordance with example embodiments of the present disclosure.

FIG. 2 illustrates a top view of clip 124 inserted in a cavity 118 of bone fixation plate 102 in accordance with example embodiments of the present disclosure. As shown in FIG. 2, bone fixation plate 102 may include top portion 128, bottom portion 129, fastener hole 104, and cavity 118. Top portion 128 may be adjacent to the top surface 106 of bone fixation plate 102. Bottom portion 129 may be adjacent to the bottom surface 108 of bone fixation plate 102. Fastener hole 104 may be positioned through bone fixation plate 102 from top surface 106 to bottom surface 108. Cavity 118 may extend outward horizontally from fastener hole 104 between top portion 128 of bone fixation plate 102 and bottom portion 129 of bone fixation plate 102.

In FIG. 2, top surface 106 and top portion 128 of bone fixation plate 102 are drawn transparently to allow a view of clip 124 located within cavity 118. In some embodiments, the body of clip 124 may include middle portion 130, corner portions 131a, 131b, side portions 132a, 132b. The body of clip 124 may also include a plurality of tabs 140a, 140b (also referred to herein collectively as tabs 140 or individually as tab 140). Middle portion 130 may extend between a first corner portion 131a and an opposing corner portion 131b. For example, first corner portion 131a and second corner portion 131b may be disposed on opposing ends of middle portion 130. Side portion 132a may extend from corner portion 131a, and side portion 132b may extend from corner portion 131b. As shown in FIG. 2, corner portions 131a and 132b may curve more sharply than the curvature of middle portion 130. Thus, middle portion 130, corner portions 131a, 131b, and side portions 132a, 132b may collectively form a body of clip 124 with a U-shape.

Referring to FIG. 1 and FIG. 2, as a fastener 110 enters a fastener hole 104, a tapered surface on the head of fastener 110 may contact tabs 140a and 140b of clip 124. The head of the fastener 110 may thus exert a wedging force pushing outward on tabs 140a and 140b of clip 124. The wedging force may flex the clip 124 outward and further into the cavity 118 adjacent to the fastener hole 104. In other words, as the fastener 110 translates through the fastener hole 104 (for example, as the fastener 110 is screwed into the adjacent body surface), a head of the fastener 110 forces clip 124 to flex (from previously being unflexed) to allow passage of the head of the fastener 110. As shown in FIG. 2, cavity 118 may include gaps 119a, 119b on opposing sides of cavity 118. Gaps 119a and 119b provide additional horizontal space in which side portions 132a and 132b of clip 124 may extend when clip 124 is in a flexed state. As also shown in FIG. 2, cavity 118 may have a widened U-shape profile similar to that of clip 124, but with additional horizontal space provided by gaps 119 and 119b on opposing sides of cavity 118. Accordingly, the widened U-shape profile may allow clip 124 to flex outward when in a flexed state while also preventing clip 124 from rotating substantially within cavity 118 when clip 124 is in either a flexed or unflexed state.

As fastener 110 continues the translation through fastener hole 104, fastener 110 may come to a seated position in the bone fixation plate 102. As described above, the head of fastener 110 may be positioned either partially or fully underneath tabs 140a and 140b of clip 124. For example, fastener 110 may be inserted until a recess in the head of fastener 110 aligns both rotationally and vertically with tabs 140a and 140b of clip 124, at which point clip 124 may return to a neutral, unflexed state, with tabs 140a and 140b resting within the recess and above a recessed surface in the head of fastener 110. Alternatively, fastener 110 may be inserted until the top surface of the head of fastener 110 passes under the tabs 140a and 140b of clip 124, at which point clip 124 may return to a neutral, unflexed state over a top surface of the head of fastener 110. In both example uses, clip 124 may maintain the positioning of the fastener 110 in the body structure and minimize and/or prevent backout of fastener 110. In either use case described above, tabs 140 of clip 124 may maintain the seated positioning of the fastener 110 and minimize and/or prevent unwanted backout of the fastener 110 from bone fixation plate 102 and the underlying body structure. For example, clip 124 may prevent unwanted backout of the fastener 110 due to micromotion.

As shown in FIG. 2, tabs 140a and 140b may have a convex shape extending inward from side portions 132a and 132b respectively. In some embodiments, tabs 140 may extend inward in a circular (for example, a semi-circle) shape. Tabs 140 of clip 124 may also be formed with other shapes suitable to maintain a position of fastener 110 after fastener 110 has been inserted through a fastener hole 104 of bone fixation plate 102. For example, tabs 140 of clip 124 may include a triangular, square, or rectangular shape that maintains the position of fastener 110 after fastener 110 has been inserted into a fastener hole 104 of bone fixation plate 102. In some embodiments, for example where tabs 140 have a triangular, square, or rectangular shape, tabs 140 may include rounded corners. The circular shape, or rounded corners of other example shapes, may help tabs 140 maintain consistent contact with a surface of the head of fastener 110 when fastener 110 has been inserted into bone fixation plate 102. For example, the circular shape or rounded corners may help tab 140 maintain consistent contact with a surface of the head of fastener 110 when fastener 110 is inserted through fastener hole 104 in a direction substantially perpendicular to bone fixation plate 102 or at an angle.

In some embodiments, clip 124 may minimize and/or prevent any loosening or backout of fasteners 110 (for example, because of micromotion). Specifically, after appropriately positioning fastener 110 through fastener hole 104 and the adjacent body surface, clip 124 may reduce unwanted rotation of fastener 110. Clip 124 may thus minimize and/or prevent the fastener 110 from egressing back out through fastener hole 104 away from bone fixation plate 102.

In some embodiments, clip 124 may be formed with a metal or a metal alloy having superelastic properties. For example, clip 124 may be formed with a resiliently flexible material that may flex under force. A spring tension of the resiliently flexible material may then cause clip 124 to return to its unflexed shape when the force is removed. In some embodiments, clip 124 may be formed with a nickel-titanium alloy referred to as nitinol. In other embodiments, clip 124 may be formed from titanium, stainless steel, medical grade plastic, or any other material suitable to provide resilient flexibility. In some embodiments, the thickness of different portions of clip 124 may be between, for example, 0.005 inches and 0.075 inches. In some embodiments, clip 124 may have a uniform thickness across the middle portion 130, corner portions 131a, 131b, side portions 132a, 132b, and tabs 140a, 140b. In other embodiments, different portions of clip 124 may have different thicknesses. For example, in some embodiments, corner portions 131a, 131b may have a thickness less than that of middle portion 130, side portions 132a, 132b, and/or tabs 140a, 140b. In such embodiments, the lesser thickness of corner portions 131a, 131b may help focus the flexion of clip 124 toward corner portions 131a and 131b. For example, in embodiments where corner portions 131a, 131b have a thickness less than that of middle portion 130, side portions 132a, 132b, and/or tabs 140a, 140b, corner portions 131a, 131b may flex more than middle portion 130 or side portions 132a, 132b when clip 124 is in a flexed state.

Figure 3A:
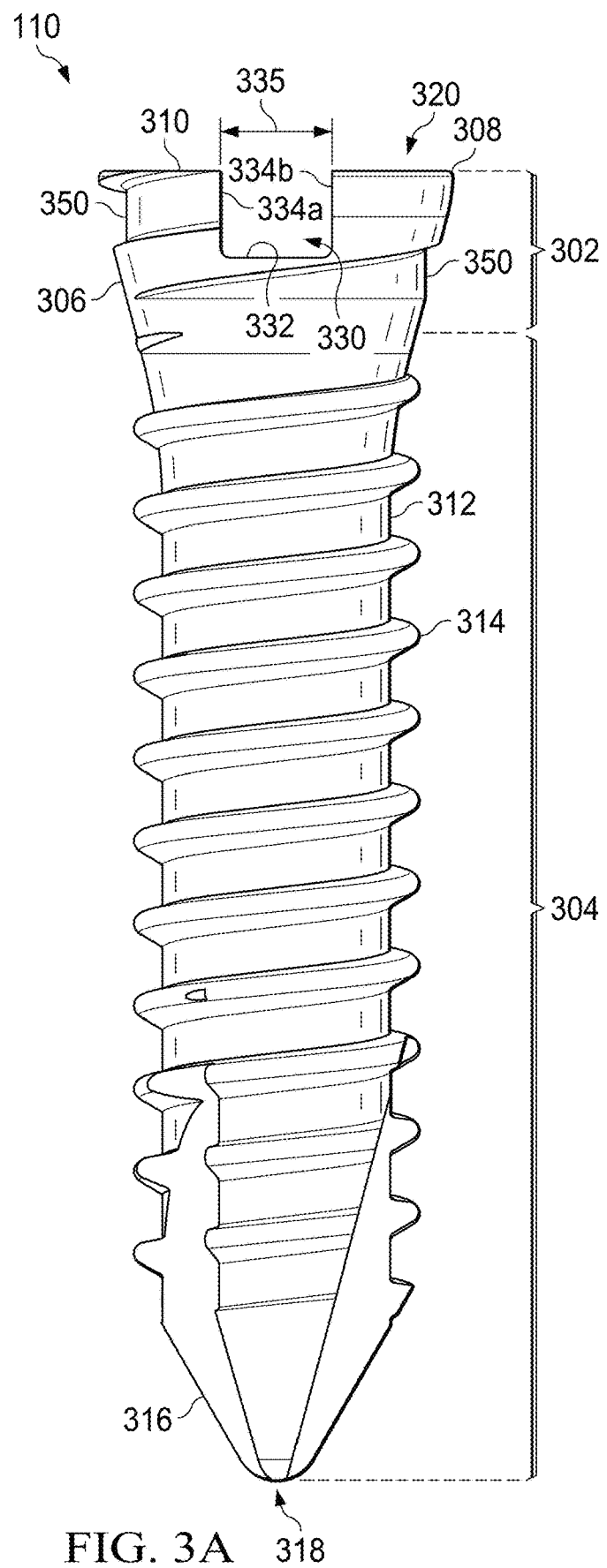
FIGS. 3A and 3B illustrate opposing side views of an exemplary fastener to be used with a bone fixation plate in accordance with example embodiments of the present disclosure.
Figure 3B:
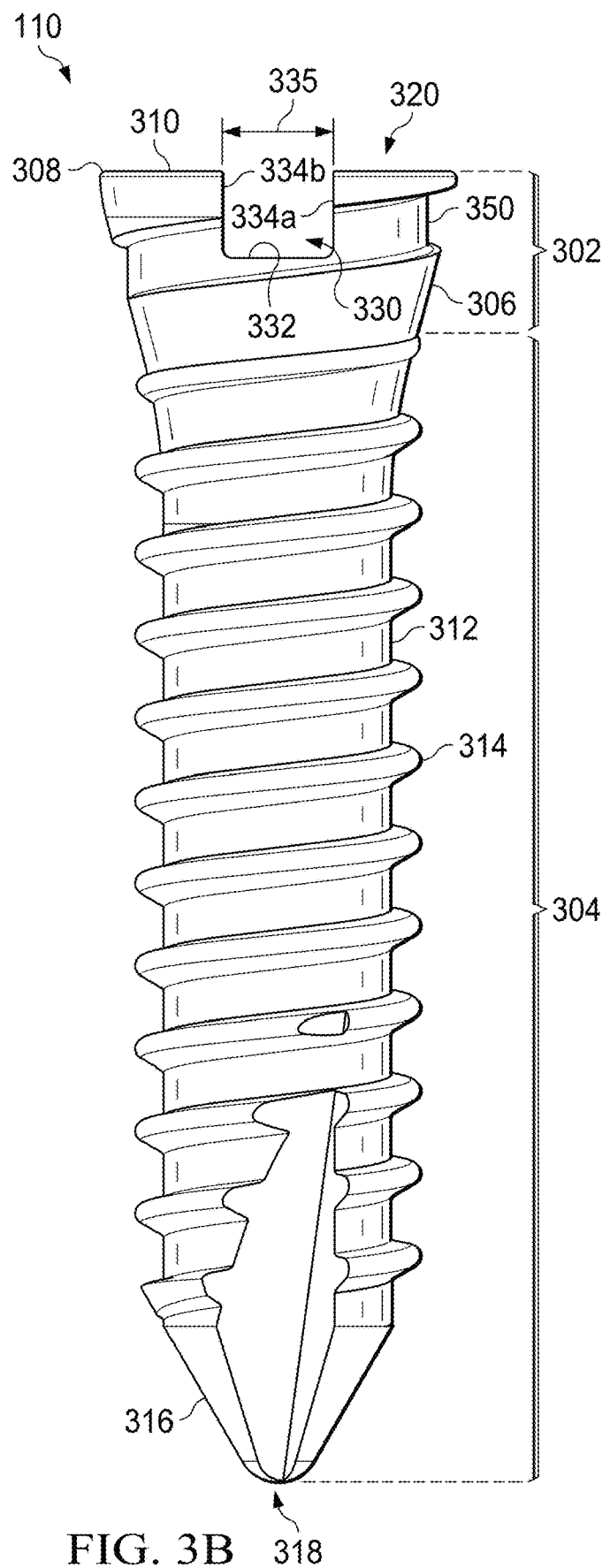

FIGS. 3A and 3B illustrate opposing side views of an exemplary fastener 110 to be used with the bone fixation plate 102 in accordance with example embodiments of the present disclosure. Fastener 110 may include head 302 and body 304. Body 304 may be coupled directly to head 302. Body 304 may also be coupled to head 302 indirectly via an intermediate portion (not illustrated in FIGS. 3A-3B).

Head 302 may be positioned at first end 320 of fastener 110. Head 302 may include tapered portion 306 and chamfer portion 308. In some embodiments, tapered portion 306 may have a spherically tapered profile. Chamfer portion 308 may have a first diameter at first surface 310 of head 302, and a second diameter at an interface between chamfer portion 308 and tapered portion 306. The first diameter may be less than the second diameter. In some embodiments, head 302 may also include an intermediate head portion (not illustrated in FIGS. 3A and 3B) between chamfer portion 308 and the tapered portion 306. The intermediate head portion may have a cylindrical shape extending the interface between the chamfer portion 308 and the spherical tapered portion 306, and may share the second diameter described directly above.

Head 302 may also include recess 330 and backout groove 350. As shown in FIGS. 3A and 3B, recess 330 may extend downward from a first surface 310 at the top of head 302 of fastener 110. And as shown by the opposing side views of FIGS. 3A and 3B, recess 330 may extend from one side of head 302 to an opposing side. Recess 330 may form sidewalls 334a and 334b on the interior sides of recess 330, and a recessed surface 332 at the bottom of recess 330. Recess 330 may have a width 335 between sidewalls 334a and 334b. The width 335 of recess 330 may be greater than a width of at least a portion of tabs 140, such that tabs 140 of clip 124 may extend at least partially into recess 330 when clip 124 is in a neutral, unflexed state.

Backout groove 350 may form a recess that spirals around an outside surface of head 302, for example around an outside surface of tapered portion 306, from the first surface 310 at the top of fastener 110 toward the body of fastener 110. The head 302 of fastener 110 may also include indent 352 in the portion of the first surface 310 adjacent to backout groove 350. As described in further detail below with reference to FIGS. 5A-5D, recess 330, backout groove 350, and indent 352 may facilitate the intentional extraction of fastener 110 from bone fixation plate 102 and the underlying bone.

The body 304 of fastener 110 may include shaft 312. Shaft 312 may include screw threads 314. Screw threads 314 may engage with a body surface such as a bone, tendon, or ligament. Body 304 may further include tip 316. Tip 316 may be conical and positioned at a second end 318 of fastener 110 opposite to the first end 320 of fastener 110.

The example embodiment of fastener 110 in FIGS. 3A and 3B is illustrated as a fully threaded cancellous screw. In other embodiments, fastener 110 may be implemented as other types of screws, for example, a partially threaded cancellous screw, a fully threaded cortical screw, a partially threaded cortical screw, a cancellous and cortical screw, and others. For example, fastener 110 may be implemented with threads over substantially the entire length of the shaft, or alternatively with threads over a portion of the length of the shaft, with at least another portion of the length of the shaft unthreaded. In some embodiments, fastener 110 may be implemented as a cancellous and cortical screw with threads of one type along a distal portion of its shaft and threads of another type along a proximal portion of its shaft. The distal portion may be immediately adjacent to the proximal portion, or the distal portion and the proximal portion may be separated from each other, for example, by an unthreaded portion.

As described above, head 302 may include tapered portion 306 that may, in some embodiments, have a spherical taper profile. The spherically tapered profile may correspond to a similarly spherically tapered profile of the sidewall of fastener hole 104. The corresponding tapers of the tapered portion 306 of head 302 and the sidewall of fastener hole 104 may allow the insertion of a fastener 110 either straight down or at an angle. For example, as illustrated in FIG. 1, different fasteners 110a-e may be inserted straight down in a direction substantially perpendicular to bone fixation plate 102, or at an angle, for example up to 45 degrees, relative to a vertical axis 150 extending through the center of a fastener hole 104 and perpendicular to bone fixation plate 102.

Figure 3C:
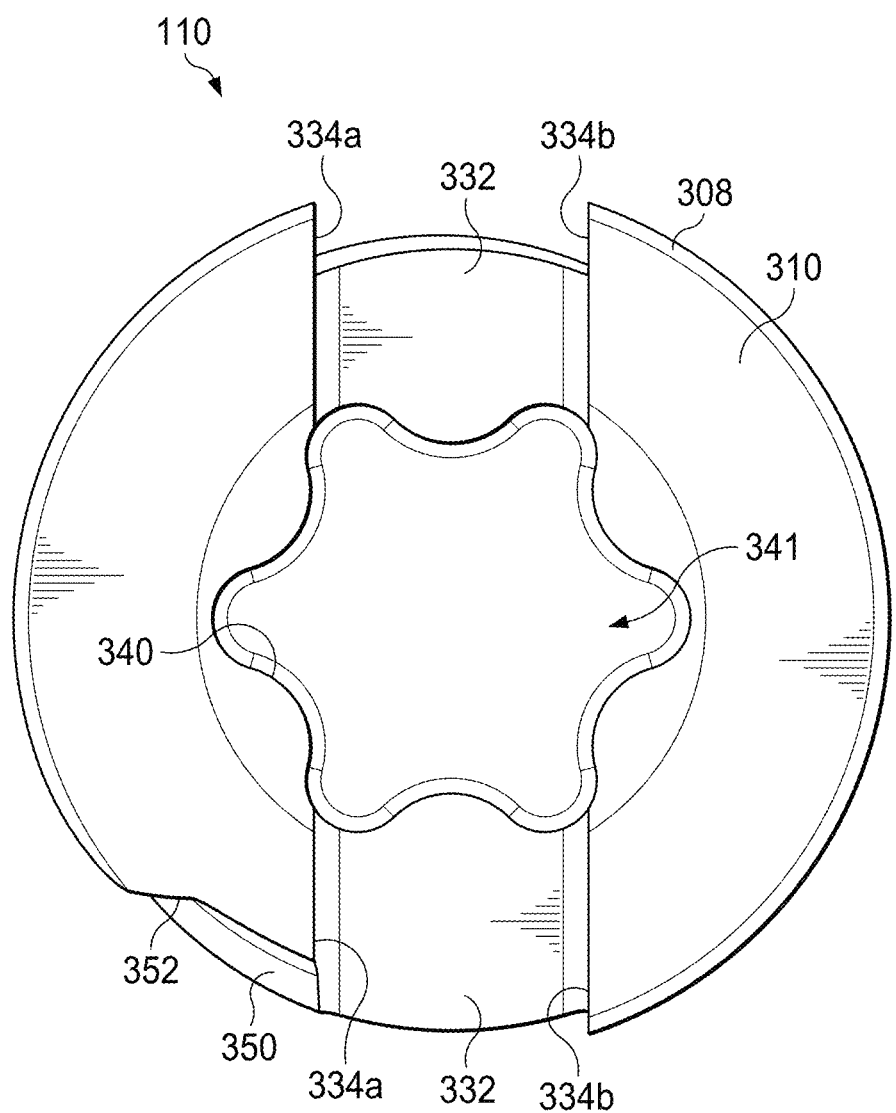
FIG. 3C illustrates a top view of an exemplary fastener to be used with a bone fixation plate in accordance with example embodiments of the present disclosure.
Figure 3D:
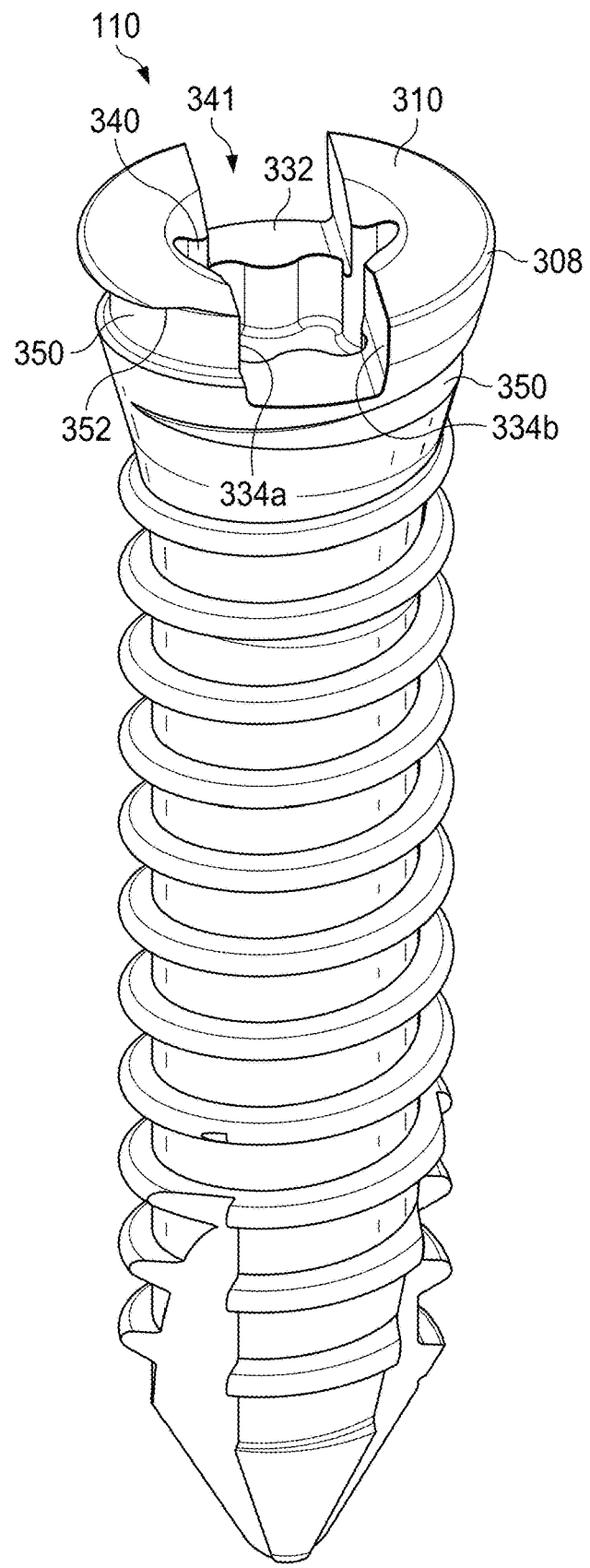
FIG. 3D illustrates a perspective view of an exemplary fastener to be used with a bone fixation plate in accordance with example embodiments of the present disclosure.

FIG. 3C illustrates a top view of fastener 110 in accordance with example embodiments of the present disclosure. FIG. 3D illustrates a perspective view of fastener 110 in accordance with example embodiments of the present disclosure. The orientation of recess 330, backout groove 350, and indent 352, as well as other features of fastener 110, may be further viewed in the top view of FIG. 3C and/or the perspective view of FIG. 3D.

As shown in FIG. 3C and FIG. 3D, recess 330 may form a cutout in the head 302 of fastener 110 spanning from a first side of head 302 of fastener 110 to a second side of head 302 opposite of the first side. Recess 330 may include side walls 334a and 334b on opposing interior sides of the cutout formed by recess 330. Further, recess 330 may include a recessed surface 332 at the bottom of the cutout formed by recess 330. As also shown in FIGS. 3C and 3D, the head 302 of fastener 110 may also include a cavity 341. For the purposes of the present disclosure, cavity 341 of fastener 110 may also be referred to as a fastener cavity 341 to distinguish from cavity 118 of bone fixation plate 102. Cavity 341 may include a contoured surface 340. As described in further detail below with reference to FIGS. 4A-4B and 5A-5C, contoured surface 340 may be configured to engage with a rotation tool that may be utilized to insert or extract fastener 110. For example, contoured surface 340 may include a 6-point star-shaped pattern that may be engaged by a 6-point star shape of a rotation tool that may be utilized to insert or extract fastener 110. The contoured surface 340 may receive a rotational force in a first direction during an insertion of fastener 110, and may receive a rotational force in a second direction, opposite to the first direction, during an extraction of fastener 110.

In some embodiments, bone fixation assembly 100 may be included in a bone fixation kit along with one or more rotation tools. In some embodiments, different rotation tools may be used to insert and extract fastener 110 through a fastener hole 104 of bone fixation plate 102. In other embodiments, the same rotation tool may be used to insert and extract fastener 110 through fastener hole 104 of bone fixation plate 102.

Figure 4A:
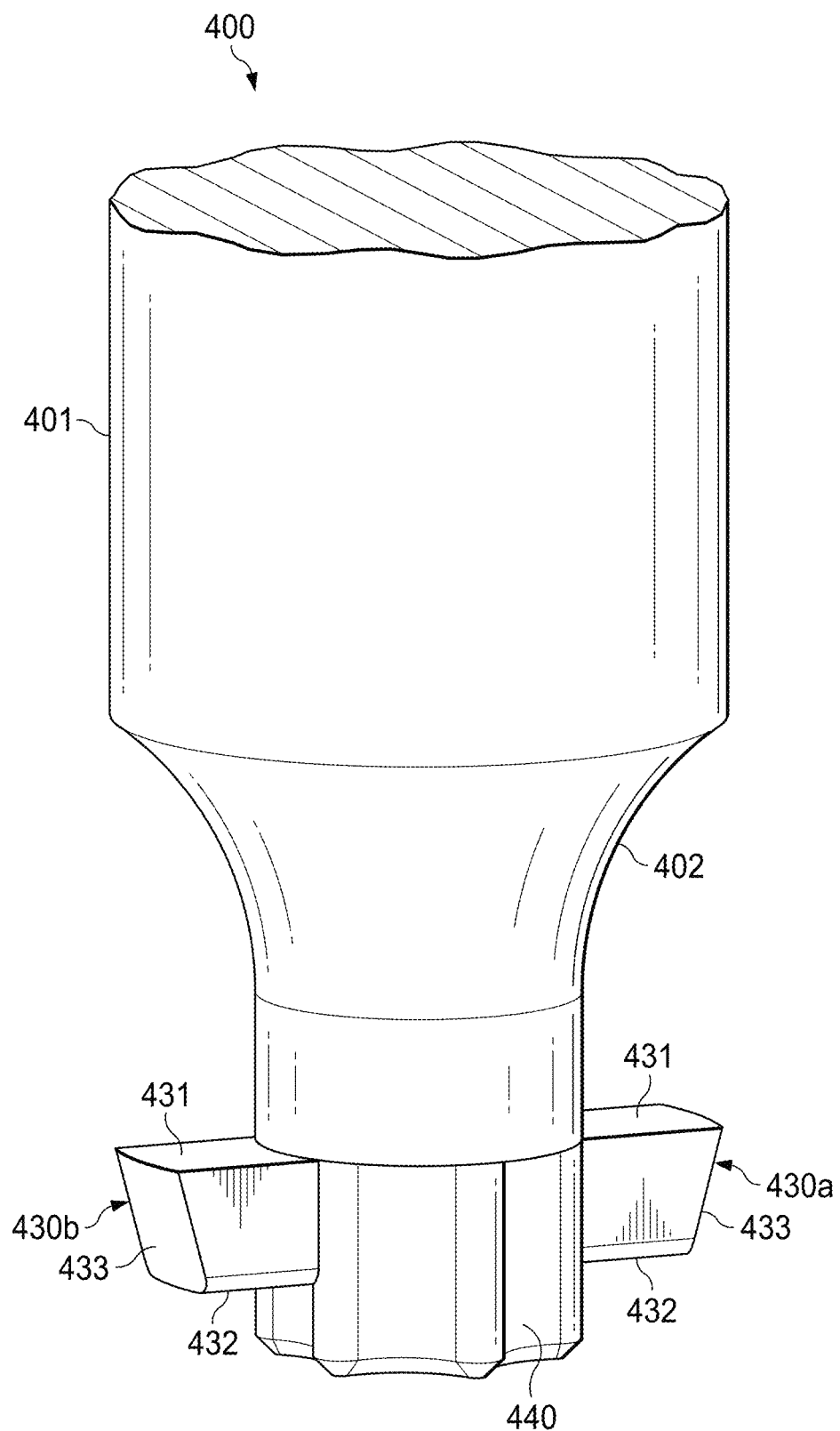
FIG. 4A illustrates a perspective view of a rotation tool to be used with a fastener in accordance with example embodiments of the present disclosure.
Figure 4B:
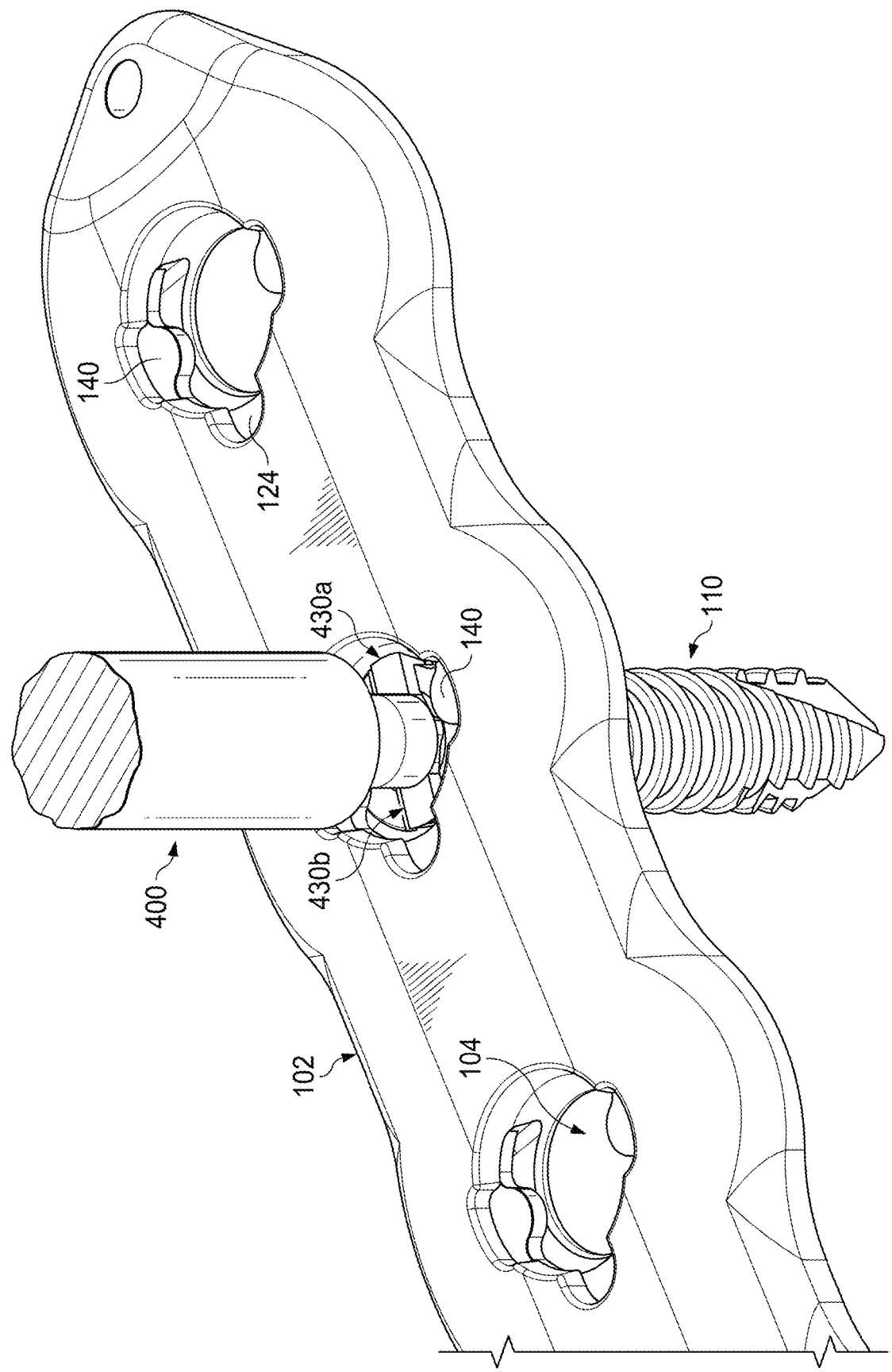
FIG. 4B illustrates a perspective view of a rotation tool engaged with a fastener in accordance with example embodiments of the present disclosure.

FIG. 4A illustrates a perspective view of a rotation tool 400 to be used with fastener 110 in accordance with example embodiments of the present disclosure. FIG. 4B illustrates a perspective view of a rotation tool 400 engaged with a fastener 110 in accordance with example embodiments of the present disclosure.

As shown in FIG. 4A, rotation tool 400 may include shaft 401, taper 402, lobes 430a and 430b, and protrusion 440. In some embodiments, shaft 401 may be coupled to a handle (not shown in FIG. 4A) to which a user may apply a rotational force. Taper 402 may couple shaft 401 to the head of rotation tool 400, which may include lobes 430a and 430b, and protrusion 440.

Lobes 430a and 430b may be shaped to fill the space of recess 330 of fastener 110 when rotation tool 400 is engaged with fastener 110. For example, lobes 430a and 430b may each include an exterior sidewall 433 that may have a tapered shape configured to align with the tapered portion 306 of the head 302 of fastener 110. Lobes 430a and 430b may also each include a bottom surface 432 configured to abut the recessed surface 332 of the recess 330 within fastener 110 when rotation tool 400 is engaged with fastener 110. Lobes 430a and 430b may also each include a top surface 431 that may align with the first surface 310 at the top of fastener 110 when rotation tool 400 is engaged with fastener 110. Further, protrusion 440 may be shaped to engage the contoured surface 340 of cavity 341 within the head 302 of fastener 110 when rotation tool 400 is engaged with fastener 110. For example, protrusion 440 may have a 6-point star shaped pattern configured to engage a 6-point star shape of the contoured surface 340 of cavity 341.

As shown in FIG. 4B, rotation tool 400 may be used to engage fastener 110 and to apply a rotational force to fastener 110 to insert fastener 110 into a fastener hole 104 of bone fixation plate 102. As described above with reference to FIG. 4A, the sidewalls 433 of lobes 431a and 431b of rotation tool 400 may be tapered in a manner to align with the tapered portion 306 of the head 302 of fastener 110. Accordingly, as fastener 110 is translated through fastener hole 104, the head 302 of fastener 110 and the sidewalls 433 of lobes 431a and 431b may together exert a wedging force to push outward on tabs 140 of clip 124 and to flex clip 124 and thus move tabs 140 outward and into the cavity 118 (shown in FIG. 2) to allow passage of the head 302 of the fastener 110. When the head 302 of the fastener 110 passes underneath tabs 140 of clip 124, clip 124 may return to its unflexed state. As such, the head 302 of fastener 110, may be seated in bone fixation plate 102 underneath clip 124 and specifically, underneath tabs 140 of clip 124.

Figure 5A:
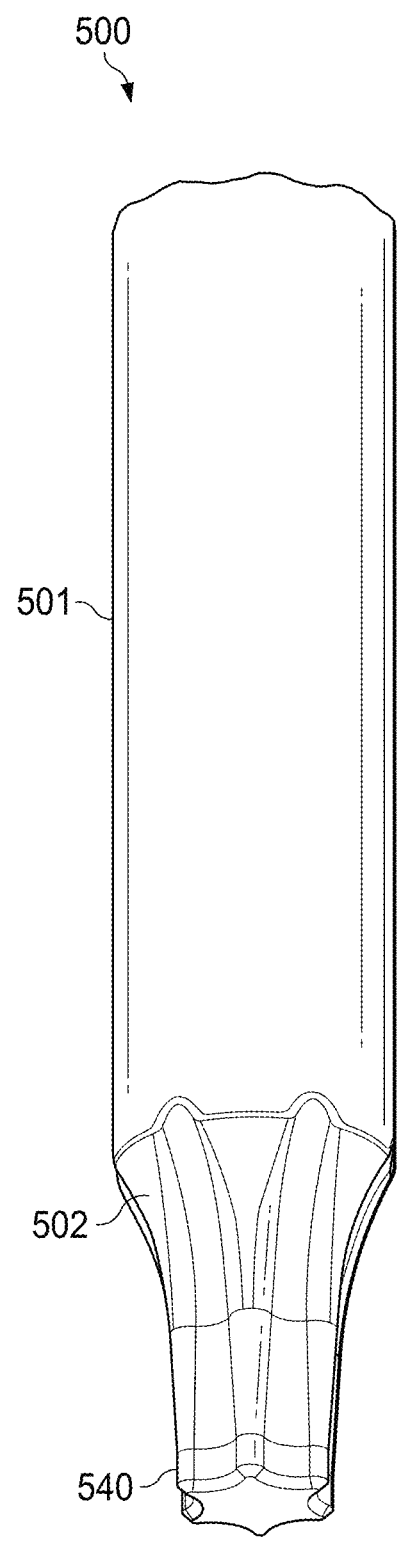
FIG. 5A illustrates a perspective view of a rotation tool to be used with a fastener in accordance with example embodiments of the present disclosure.

FIG. 5A illustrates a perspective view of rotation tool 500 to be used with a fastener in accordance with example embodiments of the present disclosure. As described below, rotation tool 500 may have multiple uses. For example, rotation tool 500 may be used to insert a fastener 110 through a fastener hole 104 and into bone underlying bone fixation plate 102. In addition, rotation tool 500 may be used to intentionally extract a fastener 110 from fastener hole 104 and the bone underlying bone fixation plate 102. During surgery, it may be advantageous to insert fastener 110 into a hard portion of the bone material. Thus, if a surgeon determines that the initial placement of fastener was inserted in an area of softer bone material, it may be advantageous to extract fastener 110 and then re-insert fastener 110 at a different angle in effort to locate an area of harder bone material. Rotation tool 500 allows for the insertion and the extraction of fastener 110 with a single rotation tool, thus reducing the number of tools that may be needed during surgery and the reducing the number of tools that must be sterilized in the surgery room.

As shown in FIG. 5A, rotation tool 500 may include shaft 501, taper 502, and protrusion 540. In some embodiments, shaft 501 may be coupled to a handle (not shown in FIG. 5A) to which a user may apply a rotational force. Taper 502 may couple shaft 501 to the head of the rotation tool 500, which may include protrusion 540. Protrusion 540 may be shaped to engage the contoured surface 340 of cavity 341 within fastener 110 when rotation tool 500 is engaged with fastener 110. For example, protrusion 540 may have a 6-point star shaped pattern configured to engage a 6-point star shape of the contoured surface 340 of cavity 341.

Figure 5B:
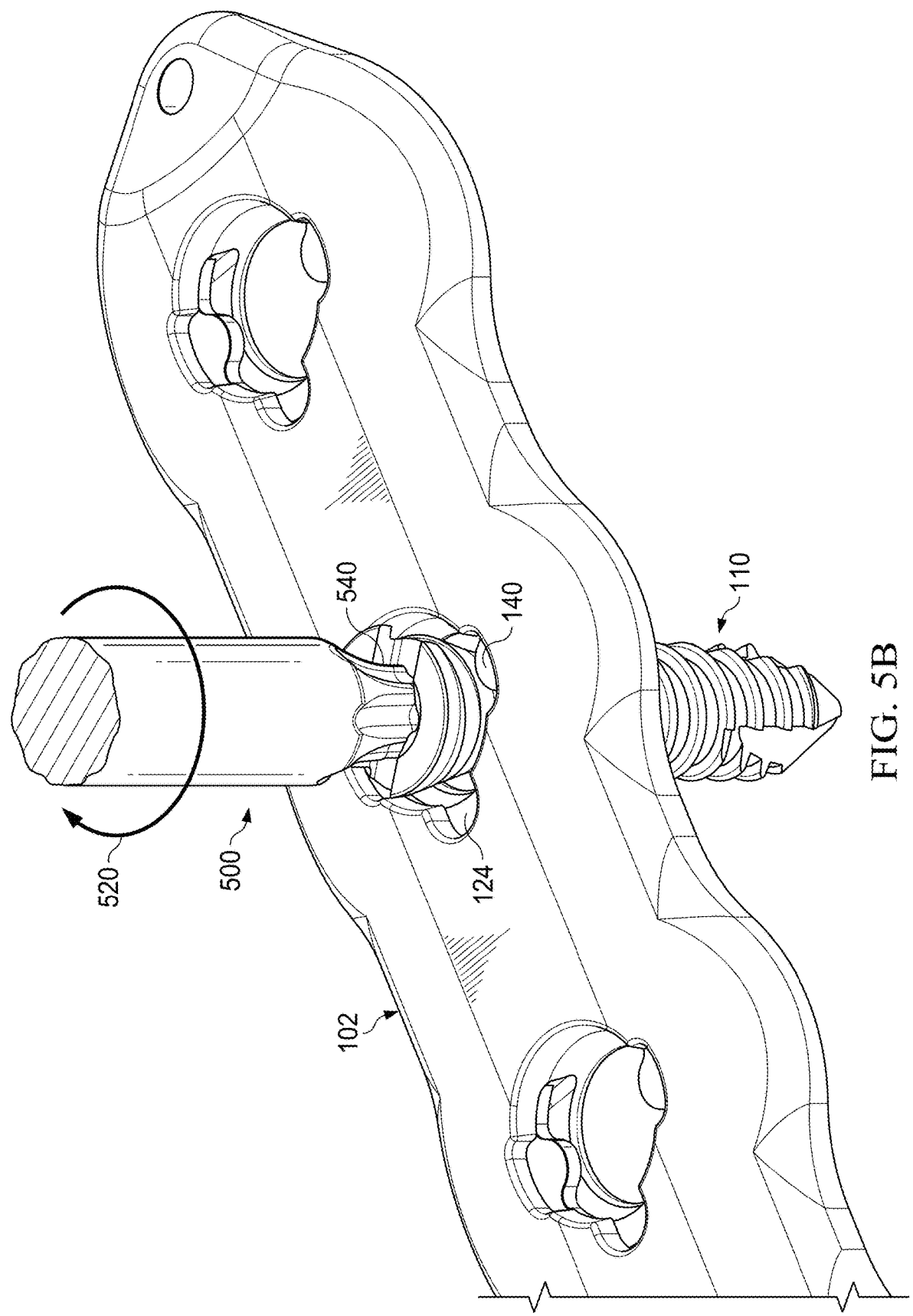
FIG. 5B illustrates a perspective view of a rotation tool engaging with a fastener in accordance with example embodiments of the present disclosure.

FIG. 5B illustrates a perspective view of rotation tool 500 engaging with fastener 110 in accordance with example embodiments of the present disclosure. As shown in FIG. 5B, protrusion 540 of rotation tool 500 may engage with the fastener 110. A rotational force applied to rotation tool 500 may thus be translated to fastener 110. In some embodiments, a rotational force may be applied in a first direction 520 to insert fastener 110 through a fastener hole 104 and into bone underlying bone fixation plate 102. As described below, a rational force may also be applied in a second direction 521 opposite to the first direction 520 to extract fastener 110 from the bone fixation system and the bone underlying bone fixation plate 102. In some embodiments, the first direction 520 may be a clockwise direction and the second direction 521 may be a counter-clockwise direction. In other embodiments, the first direction 520 may be a counter-clockwise direction, and the second direction 521 may be a clockwise direction.

Figure 5C:
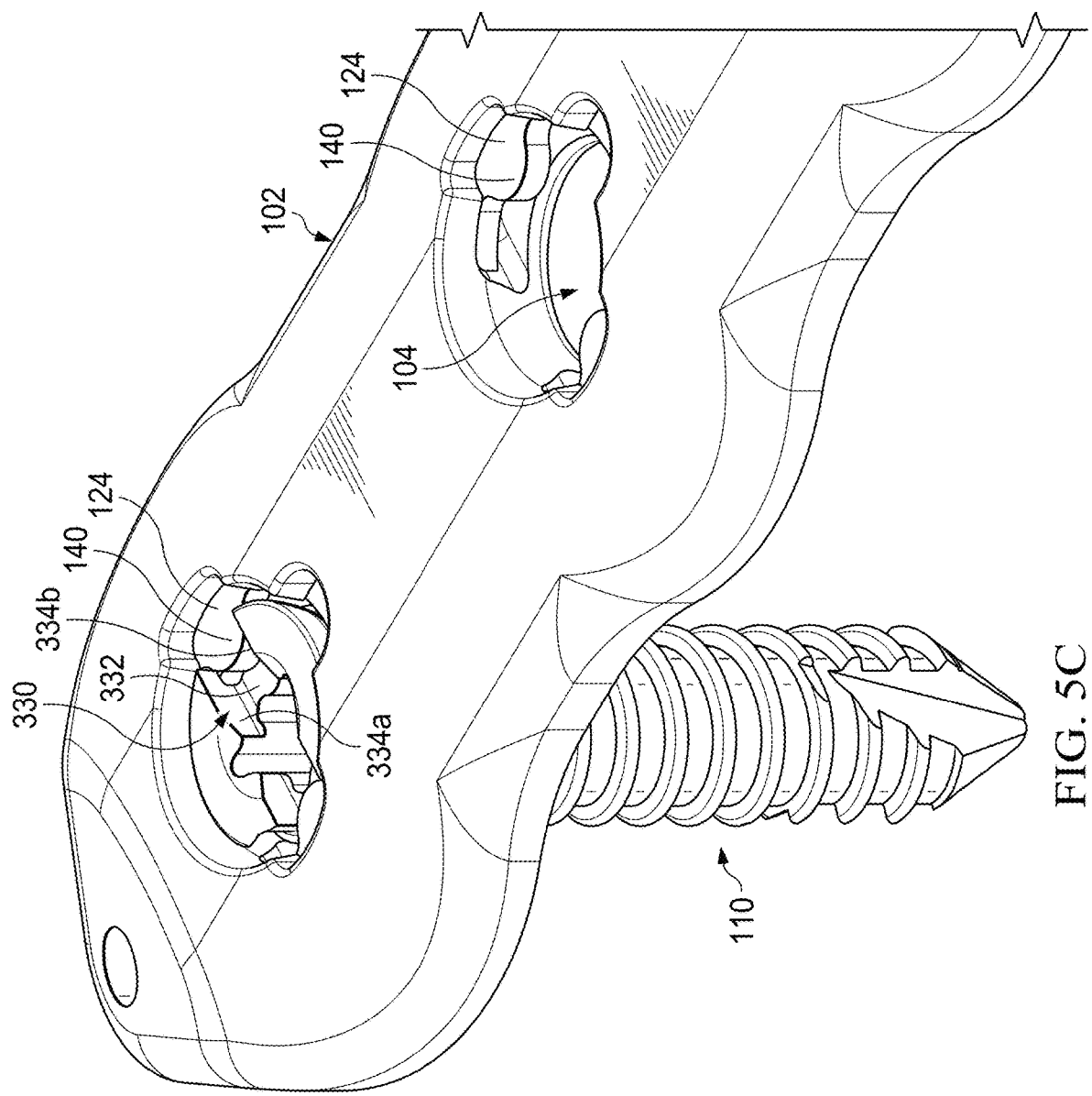
FIG. 5C illustrates a perspective view of bone fixation system for stabilization of a bone fracture site in accordance with example embodiments of the present disclosure.

As described above with reference to FIG. 3A and FIG. 3B, when fastener 110 is translated into and through fastener hole 104, the tapered portion 306 of the head 302 of fastener 110 may exert the wedging force on tabs 140 of clip 124 to flex the clip 124 from a neutral position to a flexed position such that the diameter of clip 124, and specifically the space between opposing tabs 140 of clip 124, is increased. As a continued rotational force in the first direction 520 is applied by rotation tool 500, fastener 110 will rotate and progress downward through fastener hole 104. When recess 330 in the head 302 of fastener 110 aligns both rotationally and vertically with tabs 140 of clip 124, tabs 140 may insert into the space voided by recess 330 and clip 124 may retract to its neutral, unflexed state. For example, as shown in FIG. 5C, when the recess 330 of fastener 110 aligns with tabs 140, clip 124 may retract such that end portions of tabs 140 occupy space within recess 330.

When clip 124 retracts such that tabs 140 are inserted to the space of the recess 330 of fastener 110, multiple uses cases may be utilized. In a first example use case, a further rotational force in the first direction 520 may be applied by rotation tool 500 to fastener 110. In such a use case, the sidewall 334 of recess 330 may apply a wedging force to the convex shape of tab 140 that causes clip 124 to flex outward again such that fastener 110 may continue to pass through fastener hole 104 until the head 302 of fastener 110 passes under the tabs 140 of clip 124. When the head 302 of fastener 110 passes fully under tabs 140, clip 124 may retract to a neutral, unflexed state as shown, for example, in FIG. 1. After returning to the neutral, unflexed state, tabs 140 of clip 124 may maintain the seated position of fastener 110 in bone fixation plate 102 and may thus minimize and/or prevent backout of the fastener 110 from bone fixation plate 102 and the underlying body structure. For example, clip 124 may prevent unwanted backout of the fastener 110 due to micromotion.

In a second example use case, fastener 110 may be left with portions of tabs 140 inserted into the space of recess 330. Similar to the first example use case, clip 124, and specifically tabs 140 of clip 124, may prevent unwanted backout. For example, a lower surface of tabs 140 may abut recessed surface 332 of recess 330, thereby preventing unwanted backout of fastener 110. Further, clip 124 may be configured such that the rotational force that would be required for the sidewalls 334 of recess 330 to apply a wedging force sufficient to flex clip 124 outward is greater than naturally occurring forces that would be incurred by fastener 110 after the bone fixation assembly 100 has been affixed to the bone of a patient during surgery. For example, clip 124 may also prevent unwanted backout in the second use case of fastener 110 due to micromotion.

Figure 5D:
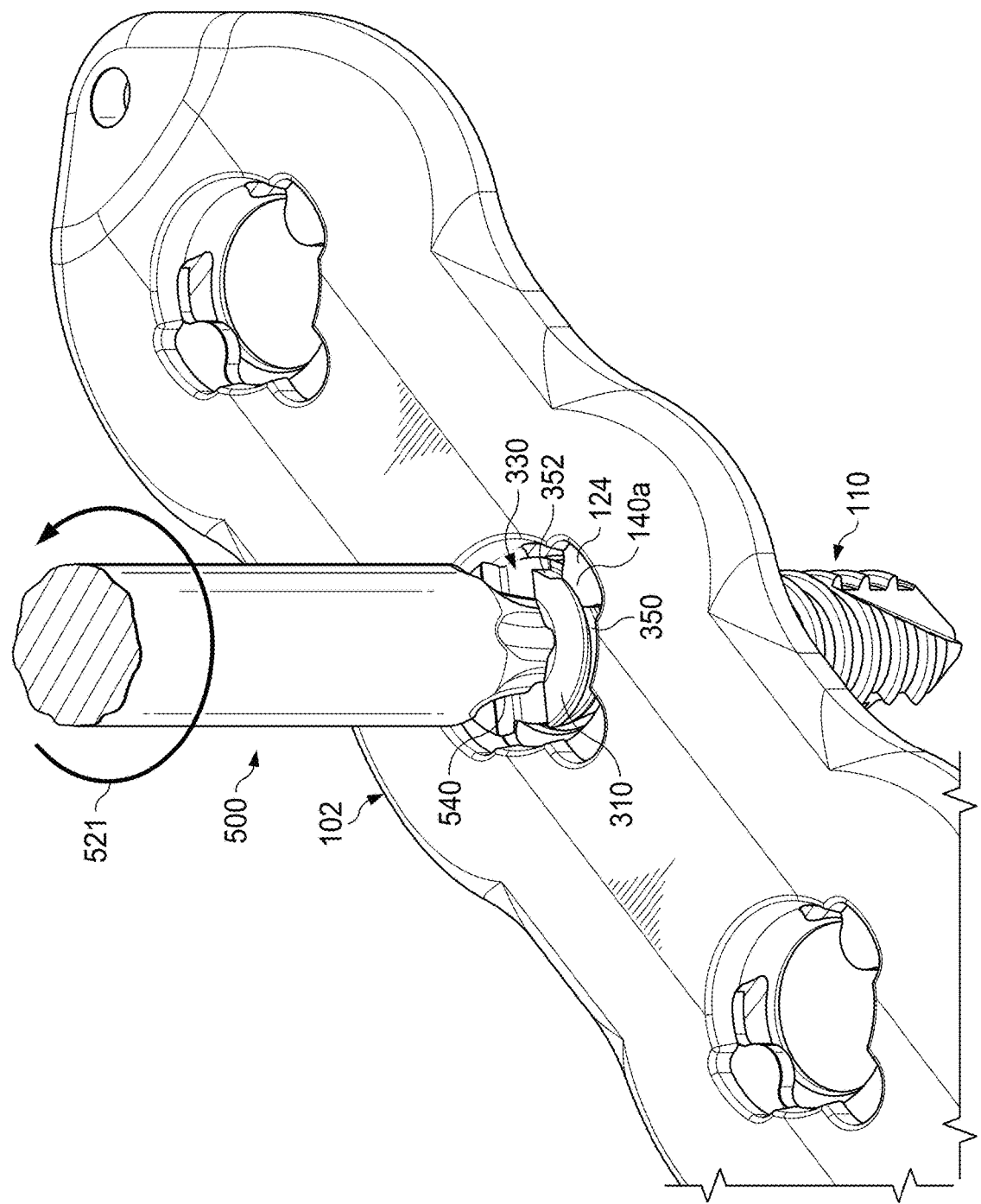
FIG. 5D illustrates a perspective view of a rotation tool engaged with a fastener in accordance with example embodiments of the present disclosure.

FIG. 5D illustrates a perspective view of rotation tool 500 engaged with fastener 110 in accordance with example embodiments of the present disclosure. As described above, in addition to being used to apply a rotational force in a first direction 520 to insert fastener 110, rotation tool 500 may also be used to apply a rotational force in a second direction 521 to extract fastener 110 from fastener hole 104 and the bone underlying bone fixation plate 102.

As described above, in a first use case, fastener 110 may have been inserted such that the first surface 310 at the top of fastener 110 is located under tabs 140 of clip 124. For such a use case, fastener 110 may be extracted from a starting point with the first surface 310 at the top of fastener 110 located under tabs 140 of clip 124. As a rotational force in the second direction 521 is applied to fastener by rotation tool 500, fastener 110 may progress vertically back out through fastener hole 104. When first surface 310 at the top of the head 302 of fastener 110 abuts a bottom surface of tabs 140, continued rotation of fastener 110 in the second direction may result in a vertical tension between tabs 140 and the head 302 of fastener 110. With continued rotation in the second direction, the tabs 140 of clip 124 may rotationally align with recess 330 and insert through the top of recess 330 into the space voided by recess 330. At that point during the extraction process, portions of tabs 140 may occupy a similar position within the space of recess 330 as illustrated in FIG. 5C with clip 124 retracted to a neutral unflexed state.

To continue extraction, further rotational force in the second direction 521 may be applied to fastener 110. With continued rotational force applied in the second direction 521, the sidewalls 334 of recess 330 may catch tabs 140 and may apply a wedging force to tabs 140 that may cause clip 124 to flex outward. On one side of the head 302 of fastener 110, clip 124 may be flexed outward such that tab 140a catches backout groove 350. And on the other side of head 302, clip 124 may be flexed outward such that tab 140b progresses to and along the outside of tapered portion 306 of head 302. Fastener 110 and clip 124 may be configured such that the rotational force required to wedge the tabs 140 of clip 124 outward, and to catch backout groove 350 of fastener 110, may be within a range of force that a user may apply to rotation tool 500 during surgery, but more than any rotational force that would otherwise naturally occur when the bone fixation assembly was fixated in a patient.

Referring back to FIGS. 3A-3D, backout groove 350 may form a recess that spirals around an outside surface of head 302, for example around an outside surface of tapered portion 306, from the first surface 310 at the top of fastener 110 toward the body of fastener 110. The head 302 of fastener 110 may also include an indent 352 in the portion of the first surface 310 adjacent to backout groove 350. Indent 352 may facilitate the catching of a tab 140 during the extraction of fastener 110 in use cases where the fastener 110 had been inserted such that the first surface 310 at the top of fastener 110 was located fully underneath tabs 140 of clip 124. To further facilitate the catching of tab 140a within backout groove 350, the height of backout groove 350 may be larger than the thickness of tabs 140 of clip 124. In some embodiments, the height of backout groove 350 may be, for example, one-and-a-half times, two times, three times, or more, larger than the thickness of tabs 140. For example, in some embodiments, tabs 140 may have a thickness of 0.025 inches and backout groove 350 may have a height of 0.05 inches.

The spiral path of backout groove 350 may spiral in the same direction as screw threads 314. The spiral path of backout groove 350 may also spiral at the same vertical rate as screw threads, such that one turn of backout groove 350 covers the same vertical distance as one turn of screw threads 314. Backout groove 350 may thus facilitate the passage of the head 302 of fastener 110 through fastener hole 104 and past tabs 140 as a rotational force in the second direction 521 is applied by rotation tool 500 to fastener 110. For example, tab 140a of clip 124 may progress through the spiral path of backout groove 350 as further rotational force in the second direction 521 is applied to back out fastener 110 from fastener hole 104. Backout groove 350 may thus allow passage of head 302 of fastener 110 back out through fastener hole and past tabs 140 of clip 124. With the head 302 of fastener 110 backed out past tabs 140 of clip 124, clip 124 may return to its unflexed state. And because the diameter of the body 304 of fastener 110 may be less than the space between tabs 140 when clip 124 is in an unflexed state, continued rotational force in the second direction 521 may further back out fastener 110 from fastener hole 104 and the bone underlying the bone fixation plate 102 until fastener 110 is fully extracted.

As described above, for some use cases, fastener 110 may have been inserted such that tabs 140 of clip 124 are inserted through the sides of recess 330 of fastener 110, as shown for example in FIG. 5C. In such use cases, fastener 110 may be extracted in a similar manner as described directly above for the later portions of the first use case. A rotational force in the second direction 521 may be applied to fastener 110 by rotation tool 500. With continued rotational force applied in the second direction 521, the sidewalls 334 of recess 330 may catch tabs 140 and may apply a wedging force to tabs 140 that may cause clip 124 to flex outward. On one side of the head 302 of fastener 110, clip 124 may be flexed outward such that tab 140a catches backout groove 350. And on the other side of head 302, clip 124 may be flexed outward such that tab 140b progresses to and along the outside of tapered portion 306 of head 302. Referring back to FIGS. 3A-3D, backout groove 350 may form a recess that spirals around an outside surface of head 302, for example around an outside surface of tapered portion 306, from the first surface 310 at the top of fastener 110 toward the body of fastener 110. Tab 140a of clip 124 may thus progress through the spiral path of backout groove 350 as further rotational force in the second direction 521 is applied to back out fastener 110 from fastener hole 104. As the head 302 of fastener 110 is backed out through fastener hole 104 and past tabs 140, clip 124 may return to its unflexed state. And because the diameter of the body 304 of fastener 110 may be less than the space between tabs 140 when clip 124 is in an unflexed state, continued rotational force in the second direction 521 may further back out fastener 110 from fastener hole 104 and the bone underlying the bone fixation plate until fastener 110 is fully extracted.

Embodiments herein may include:

A. A bone fixation assembly. The bone fixation assembly may include a bone fixation plate including a fastener hole and a cavity adjacent to the fastener hole. The bone fixation assembly may also include a clip. The clip may include a body positioned at least partially in the cavity and a plurality of tabs extending inward from the body, each tab having a convex shape extending inward from the body, wherein the body and the plurality of tabs are positioned below a top surface of the bone fixation plate. The bone fixation assembly may also include a fastener. The fastener may include a fastener body having screw threads. The fastener may also include a head coupled to the fastener body and extending from the fastener body to a first end of the fastener. The head of the fastener may include a recess extending into the head from a first surface at a first end of the fastener, the recess spanning from a first side of the head to a second side of the head opposite to the first side. The head of the fastener may also include a backout groove that spirals around a tapered portion of the head in a direction from the first end of the fastener toward the fastener body.

B. A bone fixation kit. The bone fixation kit may include a bone fixation plate including a fastener hole and a cavity adjacent to the fastener hole. The bone fixation kit may also include a clip. The clip may include a body positioned at least partially in the cavity and a plurality of tabs extending inward from the body, each tab having a convex shape extending inward from the body, wherein the body and the plurality of tabs are positioned below a top surface of the bone fixation plate. The bone fixation kit may also include a fastener. The fastener may include a fastener body having screw threads. The fastener may also include a head coupled to the fastener body and extending from the fastener body to a first end of the fastener. The head of the fastener may include a fastener cavity with a contoured surface extending into the head from a first surface at the first end of the fastener. The head of the fastener may also include a recess extending into the head from the first surface at a first end of the fastener, the recess spanning from a first side of the head to a second side of the head opposite to the first side. The head of the fastener may also include a backout groove that spirals around a tapered portion of the head in a direction from the first end of the fastener toward the fastener body. The bone fixation kit may also include a rotation tool configured to apply a rotational force to the contoured surface of the fastener cavity.

Each of the embodiments A and B may have one or more of the following additional elements in any combination: Element 1: wherein the head of the fastener further comprises a fastener cavity with a contoured surface extending into the head from the first surface at the first end of the fastener, the fastener cavity configured to receive a rotational force from a rotation tool. Element 2: wherein the backout groove spirals in the same direction as the screw threads. Element 3: wherein the backout groove and the screw threads spiral at a same vertical rate. Element 4: wherein a thickness of the plurality of tabs is less than a height of the backout groove. Element 5: wherein the head of the fastener further includes an indent in a portion of the first surface adjacent to backout groove. Element 6: wherein the plurality of the tabs of the clip are configured to insert at least partially into the recess of the fastener when the recess is vertically and rotationally aligned with the tabs. Element 7: wherein the recess forms sidewalls in the head of the fastener configured to push outward on the plurality of tabs of the clip when the plurality of tabs of the clip are at least partially inserted into the recess and a rotational force is applied to the fastener. Element 8: wherein a spherical taper of the head of the fastener is configured to push outward on the plurality of tabs of the clip when the fastener is inserted into the fastener hole. Element 9: wherein a spherical taper of the head of the fastener corresponds to a taper of the fastener hole to allow the fastener hole to receive the fastener at an angle relative to a vertical axis extending through the fastener hole. Element 10: wherein the clip is formed with a resiliently flexible material. Element 11: wherein the clip includes a middle portion having a first thickness, a first corner portion and a second corner portion respectively disposed on opposing ends of the middle portion and having a second thickness that is less than the first thickness of the middle portion, a first side portion extending from the first corner portion, and a second side portion extending from the second corner portion. Element 12: wherein a profile of the cavity adjacent to the fastener hole of the bone fixation plate is configured to allow the clip to flex outward when in a flexed state and to prevent rotation of the clip when in either the flexed state or an unflexed state. Element 13: wherein the rotation tool includes a protrusion with a shape corresponding to a contoured shape of the contoured surface of the fastener cavity. Element 14: where the rotation tool further includes a plurality of lobes configured to fill the space of the recess of the fastener when the rotation tool is engaged with the fastener.

Although examples have been described above, other modifications and variations may be made from this disclosure without departing from the spirit and scope of these examples. The above descriptions of various embodiments illustrate the principles of the invention. Numerous variations and modifications will become apparent to those skilled in the art based on the above disclosure. The following claims are intended to embrace all such variations and modifications.

What is claimed is:
1. A bone fixation assembly, comprising:
  a bone fixation plate including a fastener hole and a cavity adjacent to the fastener hole;
  a clip comprising:
    a body positioned at least partially in the cavity; and a plurality of tabs extending inward from the body, each tab having a convex shape extending inward from the body, wherein the body and the plurality of tabs are positioned below a top surface of the bone fixation plate; and a fastener comprising:
- a fastener body having screw threads;
- a head coupled to the fastener body and extending from the fastener body to a first end of the fastener, the head comprising:
  - a recess extending into the head from a first surface at the first end of the fastener, the recess spanning from a first side of the head to a second side of the head opposite to the first side; and
  - a backout groove that spirals around a tapered portion of the head in a direction from the first end of the fastener toward the fastener body.

2. The bone fixation assembly of claim 1, wherein the head of the fastener further comprises a fastener cavity with a contoured surface extending into the head from the first surface at the first end of the fastener, the fastener cavity configured to receive a rotational force from a rotation tool.

3. The bone fixation assembly of claim 1, wherein the backout groove spirals in the same direction as the screw threads.

4. The bone fixation assembly of claim 1, wherein the backout groove and the screw threads spiral at a same vertical rate.

5. The bone fixation assembly of claim 1, wherein a thickness of the plurality of tabs is less than a height of the backout groove.

6. The bone fixation assembly of claim 1, wherein the head of the fastener further includes an indent in a portion of the first surface adjacent to backout groove.

7. The bone fixation assembly of claim 1, wherein the plurality of the tabs of the clip are configured to insert at least partially into the recess of the fastener when the recess is vertically and rotationally aligned with the tabs.

8. The bone fixation assembly of claim 7, wherein the recess forms sidewalls in the head of the fastener configured to push outward on the plurality of tabs of the clip when the plurality of tabs of the clip are at least partially inserted into the recess and a rotational force is applied to the fastener.

9. The bone fixation assembly of claim 1, wherein a spherical taper of the head of the fastener is configured to push outward on the plurality of tabs of the clip when the fastener is inserted into the fastener hole.

10. The bone fixation assembly of claim 1, wherein a spherical taper of the head of the fastener corresponds to a taper of the fastener hole to allow the fastener hole to receive the fastener at an angle relative to a vertical axis extending through the fastener hole.

11. The bone fixation assembly of claim 1, wherein the clip is formed with a resiliently flexible material.

12. The bone fixation assembly of claim 1, wherein the clip comprises:
- a middle portion having a first thickness;
- a first corner portion and a second corner portion respectively disposed on opposing ends of the middle portion and having a second thickness that is less than the first thickness of the middle portion;
- a first side portion extending from the first corner portion; and
- a second side portion extending from the second corner portion.

13. The bone fixation assembly of claim 1, wherein a profile of the cavity adjacent to the fastener hole of the bone fixation plate is configured to allow the clip to flex outward when in a flexed state and to prevent rotation of the clip when in either the flexed state or an unflexed state.

14. A bone fixation kit, comprising:
- a bone fixation plate including a fastener hole and a cavity adjacent to the fastener hole;
- a clip comprising:
  - a body positioned at least partially in the cavity; and
  - a plurality of tabs extending inward from the body, each tab having a convex shape extending inward from the body, wherein the body and the plurality of tabs are positioned below a top surface of the bone fixation plate; and
- a fastener comprising:
  - a fastener body having screw threads;
  - a head coupled to the fastener body and extending from the fastener body to a first end of the fastener, the head comprising:
    - a fastener cavity with a contoured surface extending into the head from a first surface at the first end of the fastener;
    - a recess extending into the head from a first surface at a first end of the fastener, the recess spanning from a first side of the head to a second side of the head opposite to the first side; and
    - a backout groove that spirals around a tapered portion of the head in a direction from the first end of the fastener toward the fastener body; and
- a rotation tool configured to apply a rotational force to the contoured surface of the fastener cavity.

15. The bone fixation kit of claim 14, wherein the rotation tool includes a protrusion with a shape corresponding to a contoured shape of the contoured surface of the fastener cavity.

16. The bone fixation kit of claim 15, where the rotation tool further includes a plurality of lobes configured to fill a space of the recess of the fastener when the rotation tool is engaged with the fastener.

17. The bone fixation kit of claim 14, wherein the backout groove spirals in the same direction as the screw threads.

18. The bone fixation kit of claim 14, wherein the backout groove and the screw threads spiral at a same vertical rate.

19. The bone fixation kit of claim 14, wherein the plurality of the tabs of the clip are configured to insert at least partially into the recess of the fastener when the recess is vertically and rotationally aligned with the tabs.

20. The bone fixation kit of claim 19, wherein the recess forms sidewalls in the head of the fastener configured to push outward on the plurality of tabs of the clip when the plurality of tabs of the clip are at least partially inserted into the recess and the rotational force is applied to the fastener.

* * * * *